US007517428B2

(12) United States Patent
Nun et al.

(10) Patent No.: US 7,517,428 B2
(45) Date of Patent: Apr. 14, 2009

(54) PRODUCTION OF SELF-CLEANING SURFACES ON TEXTILE COATINGS

(75) Inventors: Edwin Nun, Billerbeck (DE); Markus Oles, Hattingen (DE)

(73) Assignee: Degussa AG, Duesseldorf (DE)

( * ) Notice: Subject to any disclaimer, the term of this patent is extended or adjusted under 35 U.S.C. 154(b) by 188 days.

(21) Appl. No.: 10/526,559

(22) PCT Filed: Jul. 26, 2003

(86) PCT No.: PCT/EP03/08280

§ 371 (c)(1),
(2), (4) Date: Mar. 4, 2005

(87) PCT Pub. No.: WO2004/033788

PCT Pub. Date: Apr. 22, 2004

(65) Prior Publication Data

US 2006/0128239 A1 Jun. 15, 2006

(30) Foreign Application Priority Data

Sep. 13, 2002 (DE) ................................ 102 42 560

(51) Int. Cl.

| | |
|---|---|
| ***C09J 5/02*** | (2006.01) |
| ***B44C 1/165*** | (2006.01) |
| ***B44C 1/24*** | (2006.01) |
| ***B32B 37/14*** | (2006.01) |
| ***B32B 33/00*** | (2006.01) |
| *B44C 1/17* | (2006.01) |
| *B32B 37/22* | (2006.01) |

(52) U.S. Cl. .................... 156/306.3; 156/230; 156/247; 156/289; 428/40.1; 428/41.8; 428/42.2

(58) Field of Classification Search ................. 156/230, 156/245–247, 289, 325, 329, 334, 306.3; 428/40.1, 41.8, 42.2–42.3
See application file for complete search history.

(56) References Cited

U.S. PATENT DOCUMENTS 3,650,740 A * 3/1972 Van Paesschen et al. .... 430/258

(Continued)

FOREIGN PATENT DOCUMENTS

DE 100 22 246 11/2001

(Continued)

OTHER PUBLICATIONS

U.S. Appl. No. 10/526,559, filed Mar. 4, 2005, Nun, et al.

(Continued)

*Primary Examiner*—Philip C Tucker
*Assistant Examiner*—Sonya Mazumdar
(74) *Attorney, Agent, or Firm*—Oblon, Spivak, McClelland, Maier & Neustadt, P.C.

(57) ABSTRACT

The invention relates to a process for producing self-cleaning surfaces on coated textile sheets, by the following steps of the process:
i.) applying hydrophobic nanostructured particles to a surface of a transfer-medium sheet,
ii.) applying a coating composition and a textile sheet to those surfaces of the transfer medium to which the hydrophobic nanostructured particles were applied in step i.) of the process,
iii.) heat treatment of the composite resulting from steps i.) to ii.) of the process, and
iv.) removing the transfer medium,
and also to the coated textile sheets produced by means of the process of the invention, and their use.

21 Claims, 1 Drawing Sheet

U.S. PATENT DOCUMENTS

| | | | | |
|---|---|---|---|---|
| 5,158,636 | A * | 10/1992 | Groitzsch et al. | 156/230 |
| 6,245,188 | B1 * | 6/2001 | Toyoda et al. | 156/344 |
| 6,337,129 | B1 * | 1/2002 | Watanabe et al. | 428/328 |
| 6,638,603 | B1 * | 10/2003 | Kerins et al. | 428/195.1 |
| 6,683,126 | B2 * | 1/2004 | Keller et al. | 524/492 |
| 6,811,856 | B2 | 11/2004 | Nun et al. | |
| 6,852,389 | B2 | 2/2005 | Nun et al. | |
| 6,858,284 | B2 | 2/2005 | Nun et al. | |
| 6,977,094 | B2 | 12/2005 | Oles et al. | |
| 7,083,828 | B2 | 8/2006 | Muller et al. | |
| 2002/0148601 | A1 | 10/2002 | Roos et al. | |
| 2002/0150723 | A1 | 10/2002 | Oles et al. | |
| 2002/0164443 | A1 | 11/2002 | Oles et al. | |
| 2002/0192385 | A1 | 12/2002 | Jenkner et al. | |
| 2003/0013795 | A1 | 1/2003 | Nun et al. | |
| 2003/0049396 | A1 | 3/2003 | Oles et al. | |
| 2003/0134086 | A1 | 7/2003 | Nun et al. | |
| 2003/0147932 | A1 | 8/2003 | Nun et al. | |
| 2004/0028913 | A1 | 2/2004 | Hennige et al. | |
| 2004/0154106 | A1 | 8/2004 | Oles et al. | |
| 2004/0171515 | A1 * | 9/2004 | Hamers et al. | 510/504 |
| 2005/0070193 | A1 | 3/2005 | Hennige et al. | |
| 2005/0084653 | A1 | 4/2005 | Nun et al. | |
| 2005/0103457 | A1 | 5/2005 | Nun et al. | |
| 2005/0112326 | A1 | 5/2005 | Nun et al. | |
| 2005/0118433 | A1 | 6/2005 | Oles et al. | |
| 2005/0163951 | A1 | 7/2005 | Oles et al. | |
| 2005/0167877 | A1 | 8/2005 | Nun et al. | |
| 2005/0205830 | A1 | 9/2005 | Oles et al. | |
| 2005/0208269 | A1 | 9/2005 | Nun et al. | |
| 2005/0227045 | A1 | 10/2005 | Oles et al. | |
| 2005/0253302 | A1 | 11/2005 | Nun et al. | |
| 2006/0128239 | A1 | 6/2006 | Nun et al. | |

FOREIGN PATENT DOCUMENTS

| | | | |
|---|---|---|---|
| DE | 101 35 157 | | 2/2003 |
| EP | 1153987 | A2 * | 11/2001 |
| JP | 5411577 | A * | 9/1979 |

OTHER PUBLICATIONS

U.S. Appl. No. 10/551,841, filed Oct. 3, 2005, Nun, et al.
U.S. Appl. No. 10/556,092, filed Nov. 9, 2005, Oles, et al.
U.S. Appl. No. 11/312,469, filed Dec. 21, 2005, Nun, et al.
U.S. Appl. No. 11/312,340, filed Dec. 21, 2005, Hennige, et al.
U.S. Appl. No. 10/546,979, filed Aug. 26, 2005, Nun, et al.
U.S. Appl. No. 11/321,285, filed Dec. 21, 2005, Oles, et al.
U.S. Appl. No. 11/312,557, filed Dec. 21, 2005, Oles, et al.
U.S. Appl. No. 10/111,407, filed May 6, 2002, Oles, et al.
U.S. Appl. No. 10/527,641, filed Mar. 14, 2005, Nun, et al.
U.S. Appl. No. 09/241,077, filed Feb. 1, 1999, Peters, et al.
U.S. Appl. No. 10/575,268, filed Apr. 11, 2006, Hennige, et al.
U.S. Appl. No. 10/588,952, filed Aug. 10, 2006, Nun, et al.
U.S. Appl. No. 11/572,548, filed Jan. 23, 2007, Nun, et al.

* cited by examiner

PRODUCTION OF SELF-CLEANING SURFACES ON TEXTILE COATINGS

CROSS-REFERENCES TO RELATED APPLICATIONS

This application is a national stage application of International Patent Application No. PCT/EP03/08280, filed on Jul. 26, 2003, and claims priority to German Patent Application No. 102 42 560.4, filed on Sep. 13, 2002, both of which are incorporated herein by reference in their entireties.

The invention relates to a process for producing self-cleaning surfaces on coated textile sheets, and also to the coated textile sheets produced by means of the process of the invention, and to their use.

Various processes for treating surfaces to give these surfaces dirt- and water-repellent properties are known from surface technology. For example, it is known that if a surface is to have good self-cleaning properties it has to have a certain roughness, as well as hydrophobic properties. A suitable combination of structure and hydrophobic properties permits even small amounts of moving water to entrain dirt particles which adhere to the surface and to clean the surface (WO 96/04123, U.S. Pat. No. 3,354,022, C. Neinhuis, W. Barthlott, Annals of Botany 79 (1997), 667).

As early as in 1982, A. A. Abramson in Chimia i Shisn russ. 11, 38 described the run-off of water droplets on hydrophobic surfaces, even at very small angles of inclination, especially if the surfaces have structuring, but without self-cleaning being acknowledged, and this description was also provided in Japanese Patent Application JP 07328532 A, in 1994.

The prior art of EP 0 933 388 in relation to self-cleaning surfaces requires an aspect ratio >1 and a surface energy of less than 20 mN/m for these self-cleaning surfaces, the aspect ratio being defined here as the quotient which is the ratio between the average height of the structure and its average width. The abovementioned criteria are to be found in the natural world, for example in lotus leaves. The lotus plant has a leaf surface formed from a hydrophobic waxy material and having elevations separated from one another by up to a few μm. Water droplets substantially come into contact only with the peaks of the elevations. There are many descriptions in the literature of water-repellent surfaces of this type. A relevant example here is an article in Langmuir 16 (2000), 5754, by Masashi Miwa et al., describing the increase in contact angle and roll-off angle with increasing structuring of artificial surfaces formed from boehmite, applied to a spin-coated layer and then calcined.

Swiss Patent 268258 describes a process which generates structured surfaces by applying powders, such as kaolin, talc, clay, or silica gel. Oils and resins based on organosilicon compounds are used to secure the powders to the surface. An adhesion promoter is also used in the Offenlegungsschrift DE 100 22 246 A1.

It is known that hydrophobic materials, such as perfluorinated polymers, can be used to produce hydrophobic surfaces. DE 197 15 906 A1 states that perfluorinated polymers, such as polytetrafluoroethylene or copolymers of polytetrafluoroethylene with perfluoroalkyl vinyl ethers, can generate hydrophobic surfaces which have structuring and have low adhesion to snow and ice. JP 11171592 describes a water-repellent product and its production, the dirt-repellent surface being produced by applying, to the surface to be treated, a film which comprises fine particles of metal oxide and comprises the hydrolyzate of a metal alkoxide or of a metal chelate. To consolidate this film, the substrate to which the film has been applied has to be sintered at temperatures above 400° C. This process is therefore usable only for substrates which can be heated to temperatures above 400° C. without damage or warping.

In recent times, attempts have also been made to provide self-cleaning surfaces on textiles. It has been found that self-cleaning surfaces can be produced, for example by applying hydrophobic, fumed silicas to textiles. These hydrophobic, fumed silicas are bonded into the polymer matrix of the textile fiber with the action of a solvent.

In DE 101 18 348, polymer fibers with self-cleaning properties are described, their self-cleaning surface being obtained by

- the action of a solvent which comprises structure-forming particles,
- solvation of the surface of the polymer fibers by this solvent,
- adhesion of the structure-forming particles to the solvated surface, and
- removal of the solvent.

A disadvantage of this process is that when the polymer fibers are processed (spinning, knitting, etc.) the structure-forming particles, and therefore the structure responsible for the self-cleaning surface, can become damaged or sometimes even be lost entirely, with the result that the self-cleaning effect is likewise lost.

DE 101 18 346 describes textile sheets with self-cleaning and water-repellent surface, composed of at least one synthetic and/or natural textile base material A and of an artificial, at least to some extent hydrophobic, surface with elevations and depressions made from particles which have been securely bonded to the base material A without adhesives, resins, or coatings. These elevations and depressions are obtained by treating the base material A with at least one solvent which comprises the undissolved particles, and removing the solvent, whereupon at least some of the particles become securely bonded to the surface of the base material A. However, the disadvantage of this process is the very complicated finishing of the textile surfaces. This process requires precise matching of the solvent to the base material of the textiles. However, in clothing there are generally mixed fabrics present, further complicating this matching process. If the matching of the solvents is not precise, the result can be irreparable damage to parts of the clothing. These surfaces therefore have to be treated prior to tailoring.

DE 101 35 157 describes a process for the coating of textiles during a dry-cleaning procedure, in which structure-forming particles are added to the cleaning agent. The cleaning agents proposed are organic solvents which are relatively hazardous to health, e.g. trichloroethylene or perchloroethylene, and the use of these solvents leads to mechanical anchoring of the particles to the structure of the textiles.

The conventional processes for producing self-cleaning surfaces are complicated and many of them have limited use. For example, embossing techniques are inflexible with respect to the application of structures to variously shaped three-dimensional bodies or sheets with or without fabric inserts. There is no suitable current technology for producing flat, large-surface-area web product, particularly for web product with a fabric insert. Processes in which structure-forming particles are applied to surfaces by means of a carrier—for example an adhesive or binder—have the disadvantage that the resultant surfaces are composed of various combinations of material which, for example, have different coefficients of thermal expansion, and this can lead to damage to the surface. Severe flexing or creasing can lead to cracking in these surfaces made from various combinations of material, and for this reason products produced in this way are not very suitable as protective films or tarpaulins, since these should at least to some extent adapt to the contours of the articles to be provided with protective cover. Hitherto, there has been no way to equip coatings for textile sheets with permanent water-repellent or indeed self-cleaning properties.

It was therefore an object of the present invention to provide a process for producing self-cleaning surfaces on coated textile sheets, where the resultant coated textile sheets can be flexed or creased with minimum cracking. The production of coated textile sheets is therefore intended to require no use of adhesives, binders, adhesion promoters, or other additional materials, other than the coating itself, thus retaining the flexibility of the coated textile sheet. A further intention is to avoid the use of any embossing technique in relation to the production of the self-cleaning surfaces on coated textile sheets, since these techniques are still at an early stage of their development and would require high capital expenditure. A further intention is that the method for applying the particles to the surface of the coated textile sheet does not involve a complicated downstream step of the process, e.g. application of the particles in a process which temporarily solvates the surface of the coated textile sheet with the aid of a solvent in order to achieve adhesion of the particles to the surface. A further object of this invention was therefore to integrate the step of the process which applies the particles into a prior-art process. A further object of the invention was to provide long-term anchoring of the particles to or within the surface of the coated textile sheet, thus making the self-cleaning surfaces longlasting.

Surprisingly, it has been found that coated textile sheets with a self-cleaning surface can be produced by, in a first step of the process, applying the particles to at least one surface of a transfer-medium sheet, and, in a further step of the process, applying a coating composition and a textile sheet to that surface of the transfer medium to which the particles were applied in the first step of the process. This is followed by heat treatment of the resultant composite and the removal of the transfer medium. The process of the invention can produce coated textile sheets which have a long-term self-cleaning surface. A sufficient number and density of the hydrophobic nanostructured particles can be bonded firmly into or onto the surface of the coating composition. This is particularly surprising since the coating composition is generally hydrophilic, and binding of the hydrophobic particles was unexpected.

Figure 1:
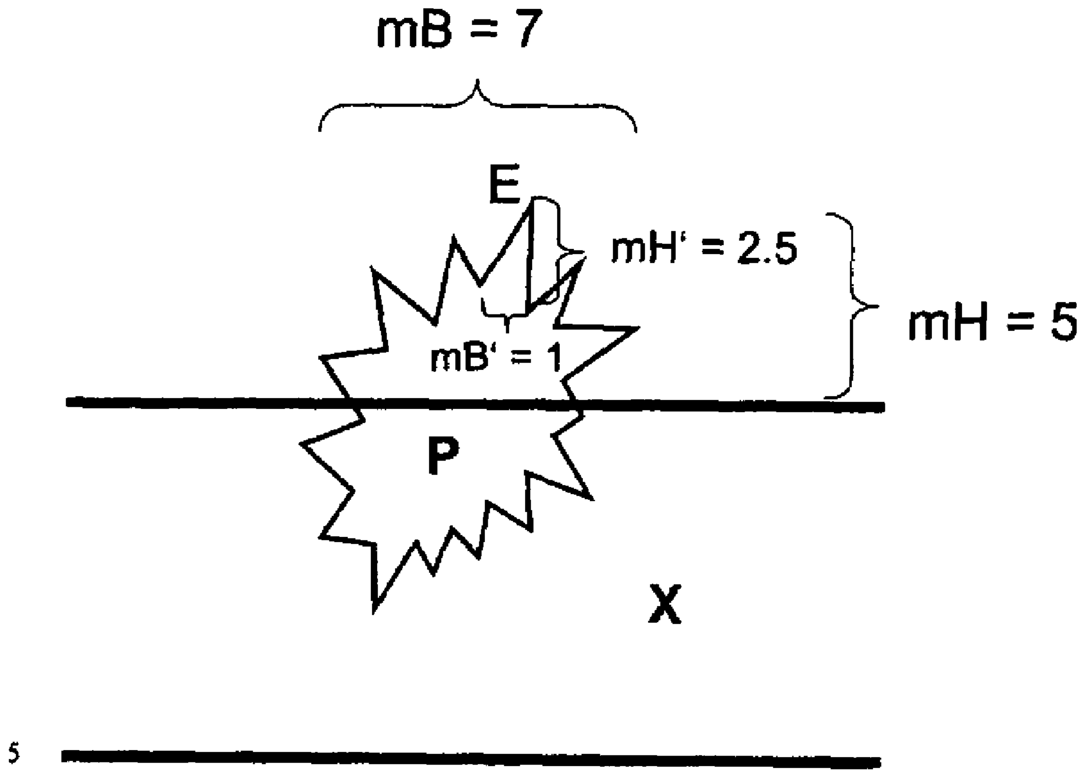
FIG. 1 shows a particle with fine structure embedded in the surface of a coated textile sheet according to the claimed invention.

The present invention provides a process for producing self-cleaning surfaces on coated textile sheets, where the process has the following steps of:

i.) applying hydrophobic nanostructured particles to a surface of a transfer-medium sheet, ii.) applying a coating composition and a textile sheet to those surfaces of the transfer medium to which the hydrophobic nanostructured particles were applied in step i.) of the process, iii.) heat treatment of the composite resulting from steps i.) to ii.) of the process, and iv.) removing the transfer medium.

The present invention also provides coated textile sheets which have hydrophobic nanostructured particles on the coating surface, and their use for the production of clothing, of technical textiles, and of fabrics for textile buildings.

The process of the invention provides access to coated textile sheets with self-cleaning properties, which may have (fabric) inserts. This process produces the self-cleaning properties without further application of material, such as a binder or adhesive—other than the particles themselves. Advantageously, the process of the invention can avoid the use of a downstream finishing process on the coated textile sheets. This method can produce coated textile sheets with self-cleaning properties which again, when compared with the coated textile sheets of the prior art, have good flexibility when creased or flexed. A particularly advantageous feature has proven to be that the areas of textile sheets for which the process of the invention can be used can be almost as large as desired. The process of the invention can moreover be used to equip both sides of the coated textile sheet with self-cleaning properties, for example, through subsequent reverse-side coating. The coated textile sheets of the invention with surfaces which have self-cleaning properties and have surface structures with elevations feature coatings which are preferably synthetic-polymer surfaces into which the particles have been directly anchored, and not bound by way of carrier systems or the like.

The process for producing self-cleaning surfaces on coated textile sheets has the following steps:

i.) applying hydrophobic nanostructured particles to a surface of a transfer-medium sheet, ii.) applying a coating composition and a textile sheet to those surfaces of the transfer medium to which the hydrophobic nanostructured particles were applied in step i.) of the process, iii.) heat treatment of the composite resulting from steps i.) to ii.) of the process, and iv.) removing the transfer medium.

In step i.) of the process of the invention, hydrophobic nanostructured particles are applied to a surface of a transfer-medium sheet. The surface of the transfer medium preferably has hydrophobic properties. As the level of hydrophobic properties of the transfer medium reduces, uniform distribution of the nanostructured hydrophobic particles becomes increasingly difficult, as therefore also does uniform transfer to the coating of the textile sheet, and this is almost impossible in the case of hydrophilic transfer media. A preferred transfer medium used is a lamination paper, particular preferably a siliconized or otherwise hydrophobicized lamination paper.

Hydrophobic nanostructured particles which may be used in step i.) of the process of the invention are those which comprise at least one material selected from minerals, aluminum oxide, silicates, hydrophobically modified silicas, metal oxides, mixed oxides, metal powders, pigments, and polymers. The particles may particularly preferably be silicates, doped silicates, minerals, metal oxides, aluminum oxide, precipitated silicas (Sipernat® grades), fumed silicas (Aerosil® grades), or pulverulent polymers, e.g. spray-dried and agglomerated emulsions or cryogenically milled PTFE. The hydrophobic particles used are particularly preferably hydrophobicized silicas.

In step i.) of the process of the invention, it is preferable to use hydrophobic nanostructured particles which have an average diameter of from 0.01 to 100 μm, particularly preferably from 0.02 to 50 μm, and very particularly preferably from 0.05 to 30 μm. However, other suitable particles are those accreted from primary particles in the suspension medium to give agglomerates or aggregates whose size is from 0.02 to 100 μm.

In step i.) of the process of the invention, it can be advantageous for the hydrophobic nanostructured particles used to have a structured surface. It is preferable to use particles whose surface has an irregular fine structure in the nanometer range, i.e. in the range from 1 to 1000 nm, preferably from 2 to 750 nm, and very particularly preferably from 10 to 100 nm. Fine structures are structures which have elevations, peaks, crevices, ridges, fissures, undercuts, notches, and/or holes with the specified dimensions and within the specified scope. These nanostructured particles preferably comprise at least one compound selected from fumed silica, fumed mixed oxides, and oxides, such as titanium dioxide or zirconium dioxide, precipitated silicas, aluminum oxide, silicon dioxide, and pulverulent polymers.

The hydrophobic properties of the particles used in step i.) of the process of the invention may be inherently present by virtue of the material used for the particles, for example as is the case with polytetrafluoroethylene (PTFE). However, it is also possible to use hydrophobic particles which have hydrophobic properties after suitable treatment, e.g. particles treated with at least one compound from the group of the alkylsilanes, the fluoroalkylsilanes, and the disilazanes. Particularly suitable particles are hydrophobicized fumed silicas, known as Aerosils®. Examples of hydrophobic particles are Aerosil® VPR 411, Aerosil® VP LE 8241, and Aerosil® R 8200. Examples of particles which can be hydrophobicized by treatment with perfluoroalkylsilane followed by heat-conditioning are Aeroperl 90/30®, Sipernat silica 350®, aluminum oxide C®, zirconium silicate, and vanadium-doped or VP Aeroperl P 25/20®.

The hydrophobic nanostructured particles are preferably applied in the form of a suspension to the transfer medium, examples for methods for this being spray-application or doctoring, in particular by means of a spreader-doctor. The suspension preferably comprises from 1 to 20% by weight, with preference from 2 to 15% by weight, and very particularly preferably from 3 to 12% by weight, of particles, based on the suspension.

The organic solvent used preferably comprises acetone, tetrahydrofuran, butyl acetate, toluene, dimethylformamide, acetonitrile, dimethyl sulfoxide, decalin, or an alcohol liquid at room temperature, in particular methanol, ethanol, n-propanol, or isopropanol. The alcohol used is very particularly preferably ethanol. However, it can also be advantageous for the suspension used to comprise a mixture of these organic solvents.

Once the hydrophobic nanostructured particles have been applied, the suspension medium is advantageously removed from the particle-containing suspension by vaporization or evaporation, and this vaporization or evaporation may be accelerated by using elevated temperatures or using subatmospheric pressure or vacuum.

In step ii.) of the process of the invention, a coating composition and the textile sheet are applied to those surfaces of the transfer medium to which the hydrophobic nanostructured particles were applied in step i.) of the process.

The coating composition preferably comprises at least one polymer selected from polyvinyl chloride, polyurethane, acrylonitrile-butadiene-styrene terpolymer (ABS), polychloroprene, in the form of a suspension, alone or together with a reactive monomer mixture which after a reaction forms at least one of the abovementioned polymers, the material here preferably being a reactive paste, particularly preferably a commercial product with good suitability for the particular use, e.g. coating compositions from the product lines Impraperm® (Bayer AG), Impranil® (Bayer AG), Baystal® (Polymer Latex GmbH), Plextol® (Polymer Latex GmbH), Liopur® (Synthopol Chemie), Larithane® and Laripur® (both Novotex Italy). The coating composition preferably has hydrophilic properties.

In a particular embodiment of the process of the invention, in step ii.) of the process, the coating composition is first applied to those surfaces of the transfer medium to which the hydrophobic nanostructured particles were applied in step i.) of the process, and then the textile sheet is applied to this coating composition.

In another particular embodiment of the process of the invention, in step ii.) of the process, the coating composition is first applied to the surfaces of the textile sheet, and then this composite is applied to those surfaces of the transfer medium to which the hydrophobic nanostructured particles were applied in step i.) of the process, the location of the coating composition being between the transfer medium, with its particles, and the textile sheet.

In both of the embodiments mentioned of the process of the invention, the coating composition may be applied by means of processes familiar to the skilled worker. The coating composition is preferably applied by means of a roller-coating method to that surface of the transfer medium to which the particles have previously been applied in step i.) of the process, or, respectively, to the textile sheet.

Step iii.) of the process of the invention heat-treats the composite resulting from steps i.) to ii.) of the process. This step of the process of the invention preferably serves to cure the coating composition.

In step iv.) of the process, the transfer medium is preferably peeled away from the coating composition and is then wound up. The transfer medium can thus be used two or more times, preferably from 2 to 15 times, for this process of the invention. In order to ensure that the coating composition applied assumes a uniform lotus effect during the curing process, renewal is preferably required according to the invention on each subsequent occasion of use.

In one particular embodiment of the process of the invention, it is also possible for the coating of a second surface to take place in a downstream step of the process, e.g. coating of the reverse side of the textile sheet. For this, steps i.) to iv.) of the process are carried out for the reverse-side surface of the textile sheet previously single-surface coated by the method of the invention.

This invention further provides coated textile sheets which have hydrophobic nanostructured particles on at least one coating surface, these coated textile sheets preferably being produced by means of the process of the invention.

These coated textile sheets of the invention preferably have, on or in their surface, hydrophobic nanostuctured particles which comprise at least one material selected from minerals, aluminum oxide, silicates, silicas, preferably hydrophobically modified silicas, metal oxides, mixed oxides, metal powders, pigments, and polymers. The particles may particularly preferably be silicates, doped silicates, minerals, metal oxides, aluminum oxide, precipitated silicas, or fumed silicas (Aerosil® grades) or pulverulent polymers, e.g. spray-dried and agglomerated emulsions, or cryogenically milled PTFE. The coated textile sheets particularly preferably comprise hydrophobic nanostructured particles which are silicas.

The coated textile sheets of the invention preferably comprise hydrophobic nanostructured particles which have an average diameter of from 0.01 to 100 μm, particularly preferably from 0.02 to 50 μm, and very particularly preferably from 0.05 to 30 μm. They may also comprise particles accreted from primary particles in the suspension medium to give agglomerates or aggregates whose size is from 0.02 to 100 μm.

It can be advantageous for the particles of the coated textile sheets of the invention to have a structured surface. The surface of the particles preferably has an irregular fine structure in the nanometer range, i.e. in the range from 1 to 1000 nm, preferably from 2 to 750 nm, and very particularly preferably from 10 to 100 nm. Fine structures are structures which have elevations, peaks, crevices, ridges, fissures, undercuts, notches, and/or holes with the specified dimensions and within the specified scope. These nanostructured particles preferably comprise at least one compound selected from fumed silica and fumed oxides, such as titanium dioxide or zirconium dioxide, or from mixed oxides, precipitated silicas, aluminum oxide, silicon dioxide, and pulverulent polymers.

The hydrophobic properties of the particles of the coated textile sheets of the invention may be inherently present by virtue of the material used for the particles, for example as is the case with polytetrafluoroethylene (PTFE). However, the coated textile sheets of the invention may also comprise hydrophobic particles which have hydrophobic properties after suitable treatment, e.g. particles treated with at least one compound from the group of the alkylsilanes, the fluoroalkylsilanes, and the disilazanes. Particularly suitable particles are hydrphobicized fumed silicas, known as Aerosils®. Examples of hydrophobic particles are Aerosil® VPR 411, Aerosil® VP LE 8241, and Aerosil® R 8200. Examples of particles which can be hydrophobicized by treatment with perfluoroalkylsilane followed by heat-conditioning are Aeroperl 90/30®, Sipernat silica 350®, aluminium oxide C®, zirconium silicate, and vanadium-doped or VP Aeroperl P 25/20®.

The surfaces of the coated textile sheets of the invention preferably have a layer with elevations which are formed by the particles themselves, with an average height of from 0.02 to 25 μm and with a maximum separation of 25 μm, preferably with an average height of from 0.05 to 10 μm and/or with a maximum separation of 10 μm, and very particularly preferably with an average height of from 0.03 to 4 μm, and/or with a maximum separation of 4 μm. The surfaces of the coated textile sheets of the invention very particularly preferably have elevations with an average height of from 0.05 to 1 μm and with a maximum separation of 1 μm. For the purposes of the present invention, the separation of the elevations is the separation of the highest elevation of an elevation represented by a particle from the most adjacent highest elevation represented by another directly neighboring particle. If an elevation has the form of a cone, the peak of the cone is the highest elevation of the elevation. If the elevation is a rectangular parallele-piped, the uppermost surface of the rectangular parallelepiped is the highest elevation of the elevation.

The wetting of solids, and therefore the self-cleaning property, may be described by using the contact angle made by a water droplet with the surface. A contact angle of 0° here implies complete wetting of the surface. The static contact angle is generally measured using devices which determine the contact angle optically. The static contact angles measured on smooth hydrophobic surfaces are usually smaller than 125°. The present surfaces of the coated textile sheets of the invention with self-cleaning surfaces have static contact angles preferably greater than 130°, with preference greater than 140°, and very particularly preferably greater than 145°. It has been found, furthermore, that a surface has particularly good self-cleaning properties only when it exhibits a difference of not more than 10° between advancing and receding angle, and for this reason the surfaces of the coated textile sheets of the invention preferably have a difference less than 10°, with preference less than 7°, and very particularly preferably less than 6°, between advancing and receding angle. To determine the advancing angle, a water droplet is placed on the surface by means of a cannula and the droplet is enlarged on the surface by adding water through the cannula. During enlargement, the margin of the droplet glides over the surface, and the contact angle is determined as the advancing angle. The receding angle is measured on the same droplet, but water is removed from the droplet through the cannula, and the contact angle is measured during reduction of the size of the droplet. The difference between the two angles is termed hysteresis. The smaller the difference, the smaller the interaction of the water droplet with the surface of the substrate, and therefore the better the self-cleaning effect.

The aspect ratio of the elevations formed by the particles themselves on the surfaces of the coated textile sheets of the invention with self-cleaning properties is preferably greater than 0.15. The elevations formed by the particles themselves preferably have an aspect ratio of 0.3 to 0.9, particularly preferably from 0.5 to 0.8. The aspect ratio is defined here as the quotient which is the ratio of the maximum height to the maximum width of the structure of the elevations.

The surface of particularly preferred coated textile sheets of the invention comprises particles with an irregular, slightly fissured fine structure, the particles preferably having elevations whose aspect ratio in the fine structures is greater than 1, particularly preferably greater than 1.5. The aspect ratio is in turn defined as the quotient which is the ratio of the maximum height to the maximum width of the elevation. FIG. 1 illustrates diagrammatically the difference between the elevations formed by the particles and the elevations formed by the fine structure. The figure shows the surface of a textile sheet coated according to the invention which comprises a particle P (only one particle being depicted to simplify the presentation). The elevation formed by the particle itself has an aspect ratio of about 0.71, calculated as the quotient which is the ratio between the maximum height of the particle mH, which is 5, since only that portion of the particle which protrudes from the surface of the coated textile sheet X contributes to the elevation, and the maximum width mB, which in turn is 7. A selected elevation E of the elevations present on the particles by virtue of their fine structure has an aspect ratio of 2.5, calculated as the quotient which is the ratio of the maximum height of the elevation mH', which is 2.5, to the maximum width mB', which in turn is 1.

It is advantageous for at least some of the hydrophobic nanostructured particles, preferably more than 50% of the particles, to be impressed into the coating of the textile sheet only to the extent of 90% of their diameter. The surface of the coated textile sheet therefore preferably has hydrophobic nanostructured particles anchored into the surface of the coating of the textile sheet to the extent of from 10 to 90%, preferably from 20 to 50%, and very particularly preferably from 30 to 40%, of their average diameter, and thus having some of their inherently fissured surface still protruding from the coating of the textile sheet. This method ensures that the elevations which are formed by the particles themselves have a sufficiently large aspect ratio, preferably at least 0.15. This method also ensures that the firmly bonded particles have very durable bonding to the coating of the textile sheet. The aspect ratio is defined here as the ratio of the maximum height of the elevations to their maximum width. A particle assumed to be ideally spherical and protruding to the extent of 70% from the surface of the coated textile sheet of the invention has an aspect ratio of 0.7 by this definition. Explicit mention should be made of the fact that the particles of the coated textile sheet of the invention are non-spherical.

The coated textile sheets comprise hydrophobic nanostructured particles as elevations, preferably on all of the coated surfaces, but with preference only on one side of the coated textile sheet. In another embodiment of the coated textile sheet, the hydrophobic nanostructured particles are present only in some regions of all of the sides of the surface, but preferably only on one side of the surface.

The coated textile sheets of the invention may be used for the production of clothing, in particular for the production of protective clothing, rainwear, and high-visibility safety clothing, or for technical textiles, in particular for the production of protective tarpaulins, tenting, protective covers, truck tarpaulins, or fabrics for textile buildings, and in particular for the production of sun-screening covers, such as awnings, sunshades, parasols.

Examples of uses of the coated textile sheets of the invention are the production of textiles for personal clothing, for the production of textiles for protective clothing, and materials for textile buildings. These coated textile sheets of the invention may, for example, be applied to buildings or vehicles so that these likewise have self-cleaning properties. However, other examples of uses of the coated textile sheets of the invention are found in the textile building sector, for the production of awnings or for sun-screening covers, or else for protective tarpaulins, truck tarpaulins, tenting, or protective coverings. The abovementioned tarpaulins are therefore also provided by the present invention. Preferred uses of the coated textile sheets of the invention are outer rainwear and safety clothing colored for high visibility.

The examples below are intended to provide further illustration of the process of the invention, and also of the coated textile sheets of the invention, but there is no intention that the invention be restricted to this embodiment.

EXAMPLE 1

A 10% strength by weight suspension of Aerosil® VP LE 8241 was prepared in a solvent. This suspension was applied by means of a pump spray to a kraft lamination paper (from SCA Flex Pack Papers GmbH, Mannheim). The amount of Aerosil on the pretreated lamination paper was 5 g/m$^2$. After evaporation of the solvent at room temperature, LARITHANE AL 227—an aliphatic polyurethane dispersion from Novotex Italy—was applied to the pretreated lamination paper by means of a film-drawing doctor, using a layer thickness of 50 μm. A tricot fabric composed of a nylon fabric (DECOTEX from IBENA Textilwerke Beckmann GmbH) was laminated into the surface of the polyurethane coating before it had fully dried. The polyurethane coating was hot-cured at a temperature of 150° C. for 2 minutes, and then the lamination paper was removed.

TABLE 1

Experimental parameters and results of characterization for Example 1

| Experiment | Solvent | Advancing angle | Receding angle |
|---|---|---|---|
| 1.1 | Ethanol, denatured | 152.3° | 149.6° |
| 1.2 | Isopropanol, pure | 149.9° | 149.0° |

EXAMPLE 2

A 10% strength by weight suspension of Aerosil® VP LE 8241 was prepared in denatured ethanol. This suspension was applied by means of a pump spray to a kraft lamination paper (from SCA Flex Pack Papers GmbH, Mannheim). The amount of Aerosil on the pretreated lamination paper was 5 g/m$^2$. After evaporation of the solvent at room temperature, a polyurethane dispersion as in Table 2 was applied to the pretreated lamination paper by means of a film-drawing doctor, using a layer thickness of 50 μm. A tricot fabric composed of a nylon fabric (DECOTEX from IBENA Textilwerke Beckmann GmbH) was laminated into the surface of the polyurethane coating before it had fully dried. The polyurethane coating was hot-cured at a temperature of 150° C. for 2 minutes, and then the lamination paper was removed.

TABLE 2

Experimental parameters for Examples 2 and 3

| Experiment | Polyurethane dispersion Name | Type |
|---|---|---|
| 2.1/3.1 | Larithane AL 227 | Aliphatic |
| 2.2/3.2 | Laripur SH1020 in methyl ethyl ketone/dimethylformamide | |
| 2.3/3.3 | Impranil ENB-03 | Aromatic |
| 2.4/3.4 | Larithane MA 80 | Aromatic |

The coated textile sheets were initially characterized visually, the result recorded being +++ for all four experiments. +++ means that there is almost complete water droplet formation. The roll-off angle is below 10°.

EXAMPLE 3

A 1.3% strength by weight suspension of Aerosil® VP LE 8241 was prepared in denatured ethanol. This suspension was applied by means of a propellant spray comprising a propane/butane mixture as propellant to a kraft lamination paper (from SCA Flex Pack Papers GmbH, Mannheim). The amount of Aerosil on the pretreated lamination paper was 5 g/m$^2$. After evaporation of the solvent at room temperature, a polyurethane dispersion as in Table 2 was applied to the pretreated lamination paper by means of a film-drawing doctor, using a layer thickness of 50 μm. A tricot fabric composed of a nylon fabric (DECOTEX from IBENA Textilwerke Beckmann GmbH) was laminated into the surface of the polyurethane coating before it had fully dried. The polyurethane coating was hot-cured at a temperature of 150° C. for 2 minutes, and then the lamination paper was removed.

The coated textile sheets were first characterized visually, the recorded result being +++ for all four experiments. +++ means almost complete water droplet formation. The roll-off angle is below 10°.

What is claimed is:

1. A process for producing a self-cleaning surface on a coated textile sheet, said process comprising:

i) applying a plurality of hydrophobic particles having a nanostructured surface to a surface of a transfer-medium sheet, ii) applying a coating composition and a textile sheet to said surface of said transfer-medium sheet to which said plurality of hydrophobic particles having a nanostructured surface were applied to obtain a composite, iii) heat treating said composite, and iv) removing said transfer-medium sheet from the composite and transferring the hydrophobic particles to the textile sheet to form the coated textile sheet having a self-cleaning surface comprising the hydrophobic particles having a nanostructured surface, wherein the process for producing a self-cleaning surface on a coated textile sheet is carried out without the use of any adhesive, binder, or adhesion promoter.

2. The process as claimed in claim 1, wherein said transfer-medium sheet has a hydrophobic surface.

3. The process as claimed in claim 2, wherein said transfer-medium sheet is a lamination paper.

4. The process as claimed in claim 1, wherein said particles have an average diameter of from 0.01 to 100 μm.

5. The process as claimed in claim 1, wherein said particles have an average diameter of from 0.02 to 50 μm.

6. The process as claimed in claim 1, wherein said particles are selected from the group consisting of minerals, aluminum oxide, silicates, hydrophobically modified silicas, metal oxides, mixed oxides, metal powders, pigments, polymers, and mixtures thereof.

7. The process as claimed in claim 1, wherein said particles have hydrophobic properties after treatment with at least one compound selected from the group consisting of alkylsilanes, fluoroalkylsilanes, and disilazanes.

8. The process as claimed in claim 1, wherein said coating composition has hydrophilic properties.

9. The process as claimed in claim 1, wherein said coating composition comprises polyvinyl chloride, acrylonitrile-butadiene-styrene terpolymer (ABS), polychloroprene, or polyurethane.

10. The process as claimed in claim 1, wherein in said applying, said coating composition is first applied to said surface of said transfer-medium sheet to which said hydrophobic particles were applied, and then said textile sheet is applied to said coating composition.

11. The process as claimed in claim 1, wherein in said applying, said coating composition is first applied to said surface of said textile sheet, and then said composite is applied to said surface of said transfer-medium sheet to which said hydrophobic particles were applied the location of said coating composition being between said transfer medium sheet, with said particles, and said textile sheet.

12. A method for the production of a clothing, a technical textile, or a fabric for a textile building, said method comprising:

producing said clothing, said technical textile or said fabric for a textile building with a coated textile sheet having a self-cleaning surface produced by said process as claimed in claim 1.

13. The method as claimed in claim 12, wherein said clothing is produced and said clothing is a rainwear or a safety clothing with high visibility.

14. The method as claimed in claim 12, wherein said technical textile is produced and said technical textile is a sun-screening cover.

15. The method as claimed in claim 12, wherein said fabric for textile building is produced and said fabric is a protective tarpaulin, a tenting, a truck tarpaulin, or another protective covering.

16. The process as claimed in claim 1, wherein the hydrophobic particles have an irregular fine nanostructured surface in the nanometer range.

17. The process as claimed in claim 1, wherein the hydrophobic particles have an irregular fine nanostructured surface with features in the range of from 1 to 1,000 nm.

18. The process as claimed in claim 1, wherein the hydrophobic particles have an irregular fine nanostructured surface with features in the range of from 10 to 100 nm.

19. The process as claimed in claim 1, wherein the process is carried out without an embossing technique.

20. The process as claimed in claim 1, which is carried out without any solvation of the surface of the coated textile sheet.

21. The process as claimed in claim 1, wherein the hydrophobic particles have an average diameter of from 30 to 100 μm.

* * * * *